(12) United States Patent
Schwetzler

(10) Patent No.: US 8,827,210 B2
(45) Date of Patent: Sep. 9, 2014

(54) ENGINE NACELLE OF AN AIRCRAFT COMPRISING A VORTEX GENERATOR ARRANGEMENT

(75) Inventor: Detlev Schwetzler, Delmenhorst (DE)

(73) Assignee: Airbus Operations GmbH, Hamburg (DE)

( * ) Notice: Subject to any disclaimer, the term of this patent is extended or adjusted under 35 U.S.C. 154(b) by 1155 days.

(21) Appl. No.: 12/663,094
(22) PCT Filed: Jun. 16, 2008
(86) PCT No.: PCT/EP2008/004841
§ 371 (c)(1),
(2), (4) Date: Dec. 4, 2009
(87) PCT Pub. No.: WO2008/151843
PCT Pub. Date: Dec. 18, 2008

(65) Prior Publication Data

US 2010/0176249 A1     Jul. 15, 2010

Related U.S. Application Data

(60) Provisional application No. 61/056,038, filed on May 26, 2008.

(30) Foreign Application Priority Data

Jun. 15, 2007 (DE) .......................... 10 2007 027 697
May 26, 2008 (DE) .......................... 10 2008 025 152

(51) Int. Cl.
*B64C 23/06* (2006.01)
*B64C 7/02* (2006.01)
*B64D 29/02* (2006.01)
(52) U.S. Cl.
CPC . *B64C 7/02* (2013.01); *B64D 29/02* (2013.01); *B64C 23/06* (2013.01); *Y02T 50/162* (2013.01)
USPC ...................................................... 244/199.1
(58) Field of Classification Search
CPC ...... B64C 23/06; Y02T 50/162; Y02T 50/166
USPC ............................... 244/199.1, 198, 121, 200
See application file for complete search history.

(56) References Cited

U.S. PATENT DOCUMENTS 2,800,291 A * 7/1957 Stephens ........................ 244/200
3,741,285 A * 6/1973 Kuethe ........................... 165/181
(Continued)

FOREIGN PATENT DOCUMENTS

DE          3246737 A1      6/1983
DE   102007027697 A1    12/2008
(Continued)

OTHER PUBLICATIONS

International Search Report for corresponding PCT application PCT/EP2008/004841, Jun. 11, 2008.
(Continued)

*Primary Examiner* — Valentina Xavier
(74) *Attorney, Agent, or Firm* — Ingrassia Fisher & Lorenz, P.C.

(57) ABSTRACT

An engine nacelle of an aircraft, which engine nacelle on one side comprises several fin-shaped vortex generators so that with an increase in the angle of attack, to improve maximum lift, the field of vorticity generated by said vortex generators overall extends over an increasing region of the wing in the direction of the wingspan, with the first vortex generator being located within a positioning corridor situated between two boundary lines, wherein: the starting point of the first boundary line is the circumferential point of the engine nacelle with the engine-nacelle circumferential angle phi=35 degrees and the engine-nacelle longitudinal coordinate X=L/4; the end point of the first boundary line is the circumferential point of the engine nacelle with the engine-nacelle circumferential angle phi=25 degrees and the engine-nacelle longitudinal coordinate X=L·⅔; the starting point of the second boundary line is the circumferential point of the engine nacelle with the engine-nacelle circumferential angle phi=90 degrees and the engine-nacelle longitudinal coordinate X=L/4; the end point of the second boundary line is the circumferential point of the engine nacelle with the engine-nacelle circumferential angle phi=55 degrees and the engine-nacelle longitudinal coordinate X=L·⅔.

13 Claims, 5 Drawing Sheets

(56) References Cited

U.S. PATENT DOCUMENTS

| | | | |
|---|---|---|---|
| 3,744,745 A * | 7/1973 | Kerker et al. | 244/199.1 |
| 4,466,587 A * | 8/1984 | Dusa et al. | 244/121 |
| 4,540,143 A * | 9/1985 | Wang et al. | 244/130 |
| 4,685,643 A * | 8/1987 | Henderson et al. | 244/199.1 |
| 5,833,389 A | 11/1998 | Sirovich | |
| 7,866,608 B2 * | 1/2011 | Atinault | 244/199.1 |
| 8,087,617 B2 * | 1/2012 | Sclafani et al. | 244/204.1 |
| 8,323,775 B2 * | 12/2012 | van Merkstoijn | 428/167 |
| 2005/0011993 A1 * | 1/2005 | Konings | 244/198 |
| 2006/0060722 A1 | 3/2006 | Choi | |
| 2009/0039203 A1 * | 2/2009 | Atinault | 244/199.1 |
| 2010/0176249 A1 | 7/2010 | Schwetzler | |

FOREIGN PATENT DOCUMENTS

| | | |
|---|---|---|
| EP | 0850832 A1 | 7/1998 |
| FR | 2891525 A | 4/2007 |
| WO | 03106260 A1 | 12/2003 |

OTHER PUBLICATIONS

International Preliminary Report on Patentability Report for corresponding PCT application PCT/EP2008/004841, Dec. 17, 2009.
European Office Action for related EP Application 08759254.9-2422, Jul. 16, 2010, corresponding to PCT application PCT/EP2008/004841.

* cited by examiner

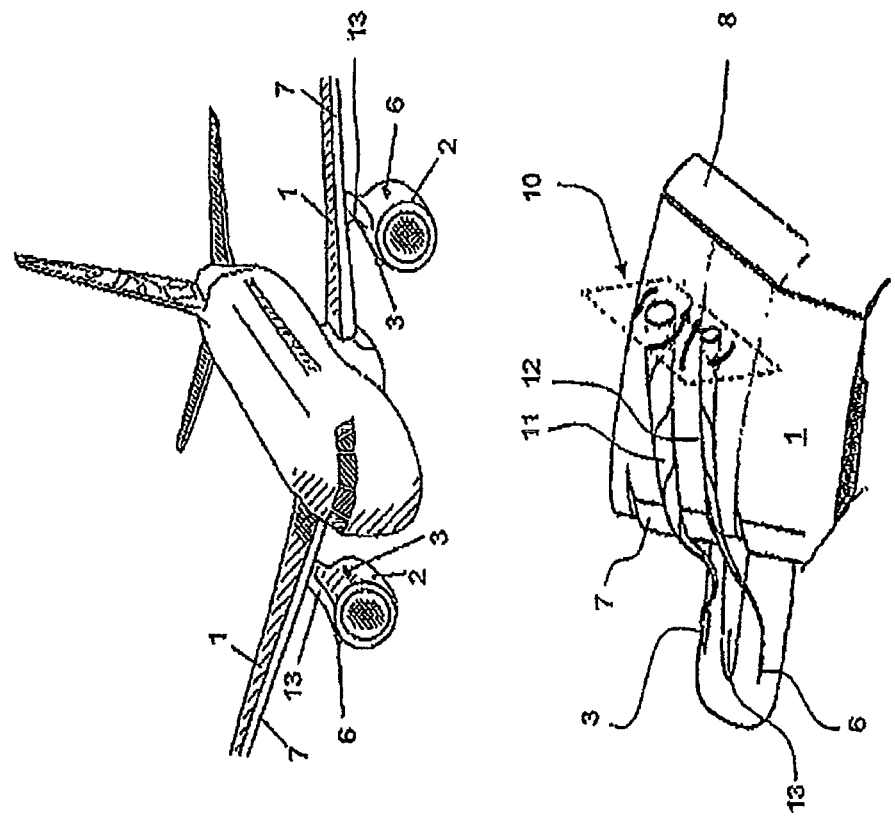

ENGINE NACELLE OF AN AIRCRAFT COMPRISING A VORTEX GENERATOR ARRANGEMENT

BACKGROUND

The invention relates to a vortex generator to be installed on an outer flow surface of an aircraft, as well as to an engine nacelle of an aircraft with a vortex generator arrangement.

In view of the performance of an aircraft, in particular of a commercial aircraft or transport aircraft with a heavy take-off weight, the maximum achievable lift in the takeoff and landing phase is of particular importance. Said lift depends on the size and geometry of the wing, and, to a limited extent, on the airflow separation at the top of the wing profile, which starts as the angle of attack of the aircraft increases. In order to increase the maximum achievable lift, slats or leading-edge flaps are provided as high-lift devices at the wing, usually at its front, while trailing-edge flaps are provided at the rear of the wing. With an advantageous design of these high-lift elements it is possible to shift the commencement of airflow separation on the wing to significantly higher angles of attack.

There is a further effective measure in order to shift the maximum achievable lift to still higher angles of attack, namely in that by means of suitably designed vortex generators fields of vorticity are generated at the top of the wing, which fields of vorticity increase in intensity as the angle of attack of the aircraft increases. The outside of the engine nacelle of engines that are arranged on the wing is a suitable location for the installation of such vortex generators. With an optimal arrangement and at high angles of attack, such vortex generators, which are known as nacelle strakes or chines, generate a powerful vortex that flows over the wing, where on a slat in front of said wing it delays airflow separation until the aircraft flies at greater angles of attack.

According to U.S. Pat. No. 4,540,143, depending on a particular application, at least a combination, comprising a fin-shaped vortex generator and a boundary layer fence that continues from said vortex generator without a transition and at an even height, is provided on one side or on both sides of the engine nacelle. With such combinations comprising a fin-shaped vortex generator and a boundary layer fence, it is possible not also to achieve the formation of one or several vortices, which as far as possible are spatially limited, but also to limit the propagation, in the direction of the wingspan, of airflow separation which occurs as a result of the front upper edge of the engine nacelle and extends from that location over the wing, in that one or several vortex/vortices is/are formed that is/are spatially limited as far as possible.

From U.S. Pat. No. 3,744,745 it is known to provide a vortex generator on each side of the engine nacelle. In this way an increase in the intensity of the downwash flow field is to be achieved.

SUMMARY OF THE INVENTION

It is the object of the invention to create a vortex generator arrangement that improves the lift of the wing, in particular in the case of increasing angles of attack.

According to the invention an engine nacelle with an arrangement of vortex generators is provided, which arrangement is designed such that with it the flow at the outer flow surface across the direction of flow becomes turbulent in a region that is as extensive as possible.

According to the invention no influence on the airflow based on flow disruptions or flow separation is to take place that emanates from the leading edge of the engine nacelle, as is provided in prior art. Instead, with the measures according to the invention the airflow is to be made to become turbulent in a region that is as extensive as possible in the direction of the wingspan. In this way, according to the invention, the boundary layer is changed in a sheet-like region above the wing. Surprisingly, a wing with the vortex generators according to the invention supports a greater angle of attack and thus greater maximum lift of the entire wing.

Prior art does not suggest that this effect occurs, and that this measure, surprisingly, improves lift, in particular at an increasing angle of attack, without having a negative influence on the drag at cruising.

From various aircraft types such as A320, A340, B777, B737 it is known to provide a single vortex generator on the side of the fuselage, which side faces the engine or the engine nacelle. Furthermore, from the aircraft types DC10, A321, A319, A318 it is known to provide an individual vortex generator on each side of the engine or of the engine nacelle. This known arrangement is associated with a disadvantage in that, due to the spatial characteristics of the flow field, the vortex generated by the vortex generator is effective only in a region that is very limited in relation to the direction of the wingspan, usually in close proximity to the engine pylon.

The object according to the invention is met by an engine nacelle of an aircraft, which engine nacelle comprises a nacelle housing with a first and a second side and several fin-shaped vortex generators that are arranged on one of the two sides of the nacelle housing such that with an increase in the angle of attack, to improve maximum lift, the field of vorticity generated by them overall extends over an increasing region of the wing in the direction of the wingspan.

In this context the term "engine nacelle" refers to an engine nacelle for accommodating an engine. The engine nacelle need not comprise the engine.

The terms "first side" and "second side" refer to the sides of the nacelle housing, which sides are opposite each other in relation to the engine pylon; in other words in each case the side facing towards the fuselage, and the side facing away from the fuselage.

As a result of the provision of fin-shaped vortex generators, the air that flows around the nacelle housing becomes turbulent in a wide region. The fin shape of the vortex generators is characterised in that the external contour of the vortex generator, which contour projects from the nacelle housing, is designed so as to gradually rise in the entire region between the starting point and the end point of the external contour.

DETAILED DESCRITION OF THE INVENTION

In this arrangement, in particular the vortex generators can be arranged on the fuselage-side of the nacelle housing.

According to a further exemplary embodiment of the invention with several fin-shaped vortex generators being arranged on one of the two sides of the nacelle housing, on the other side of the two sides of the nacelle housing at least one fin-shaped vortex generator is arranged.

Furthermore, according to an exemplary embodiment of the invention an engine nacelle can be provided on whose two sides of the nacelle housing several fin-shaped vortex generators are arranged.

If several vortex generators are arranged on a side of the nacelle housing, according to the invention it is provided for the frontmost point of a first vortex generator to be located within a positioning corridor situated between two boundary lines, wherein:

the starting point of the first boundary line is the circumferential point of the engine nacelle with the engine-nacelle circumferential angle phi=35 degrees and the engine-nacelle longitudinal coordinate X=L/4;

the end point of the first boundary line is the circumferential point of the engine nacelle with the engine-nacelle circumferential angle phi=25 degrees and the engine-nacelle longitudinal coordinate X=L·⅔;

the starting point of the second boundary line is the circumferential point of the engine nacelle with the engine-nacelle circumferential angle phi=90 degrees and the engine-nacelle longitudinal coordinate X=L/4;

the end point of the second boundary line is the circumferential point of the engine nacelle with the engine-nacelle circumferential angle phi=55 degrees and the engine-nacelle longitudinal coordinate X=L·⅔.

The first vortex generator can, in particular, be the vortex generator with the position of the smallest angle phi, in other words in each case the uppermost vortex generator.

In this arrangement the boundary lines are provided as lines that extend along the external circumference or on the external circumferential area of the engine nacelle, which lines are the shortest lines between the starting point of said external circumference and the end point of said external circumference.

Furthermore, it can be provided for the second vortex generator to be situated on the engine's circumferential angle of phi=10 to 30 degrees below the first vortex generator.

In the arrangement of two or more vortex generators it can be provided in each case for two vortex generators positioned side-by-side to be arranged so as to overlap in longitudinal direction.

The longitudinal direction of the vortex generators can be inclined by delta-theta=0 to 10 degrees in relation to the longitudinal axis of the engine nacelle.

Each vortex generator in its connection region or intersection region with the outer flow surface of the nacelle housing has a length that extends in longitudinal direction of the vortex generator. The external contour of the vortex generator, which external contour protrudes from the outer flow surface, can be designed such that it extends, gradually rising over the connection region, from the outer flow surface of the nacelle housing to a maximum height at the rear end of the respective vortex generator.

In a particular application case the external contour of at least one vortex generator can be designed as a straight line.

In all the exemplary embodiments of the vortex generators provided, the ratio of the overall length LG to the maximum height HG of the vortex generator can be between 1.4 and 3.6. In this arrangement, or in addition, the overall length LG of the vortex generator relative to the length of the engine nacelle can be between 0.1 and 0.15.

In a further exemplary embodiment of the vortex generator it can be provided for the external contour of the vortex generator, which contour protrudes from the outer flow surface, in relation to the gradient of the connection region in longitudinal direction of the vortex generator to be defined by the function $Y=HG \cdot [1-(LG-X)^2/LG^2]$, with:

X being the longitudinal coordinate of the vortex generator with an overall length LG of the vortex generator;

Y being the height coordinate of the vortex generator with a maximum height HG of the vortex generator in relation to the outer flow surface (A) on the longitudinal coordinate X=LG;

wherein the external contour protruding from the outer flow surface is within the range of ±10% of the Y-value resulting from the function.

Generally speaking, the area of the fins that form the vortex generators can be arranged so as to be radial in relation to the engine nacelle.

BRIEF DESCRIPTION OF THE DRAWINGS

Below, exemplary embodiments of the invention are described with reference to the enclosed figures which show the following:

FIG. 1 a perspective view of a commercial aircraft with a vortex generator arrangement according to prior art, which vortex generator arrangement is provided on the respective engine nacelle;

FIG. 2 a perspective view of part of a wing comprising an engine nacelle with a vortex generator arrangement according to prior art, in which, in addition, the aerodynamic effect caused by prior art is shown;

FIG. 1 shows a perspective view of an aircraft obliquely from the front, with vortex generators according to prior art being provided on the engine nacelle of said aircraft. The aircraft comprises a wing 1, at the leading edge of which wing 1 respective slats 7 are provided as lift-increasing elements. Furthermore, on the wing 1, engine nacelles 2, each accommodating an engine, are arranged, which engine nacelles are arranged below the leading edge of the wing. The engine nacelles 2 are structurally connected to the wing 1 by way of respective engine pylons 13.

Figure 3:
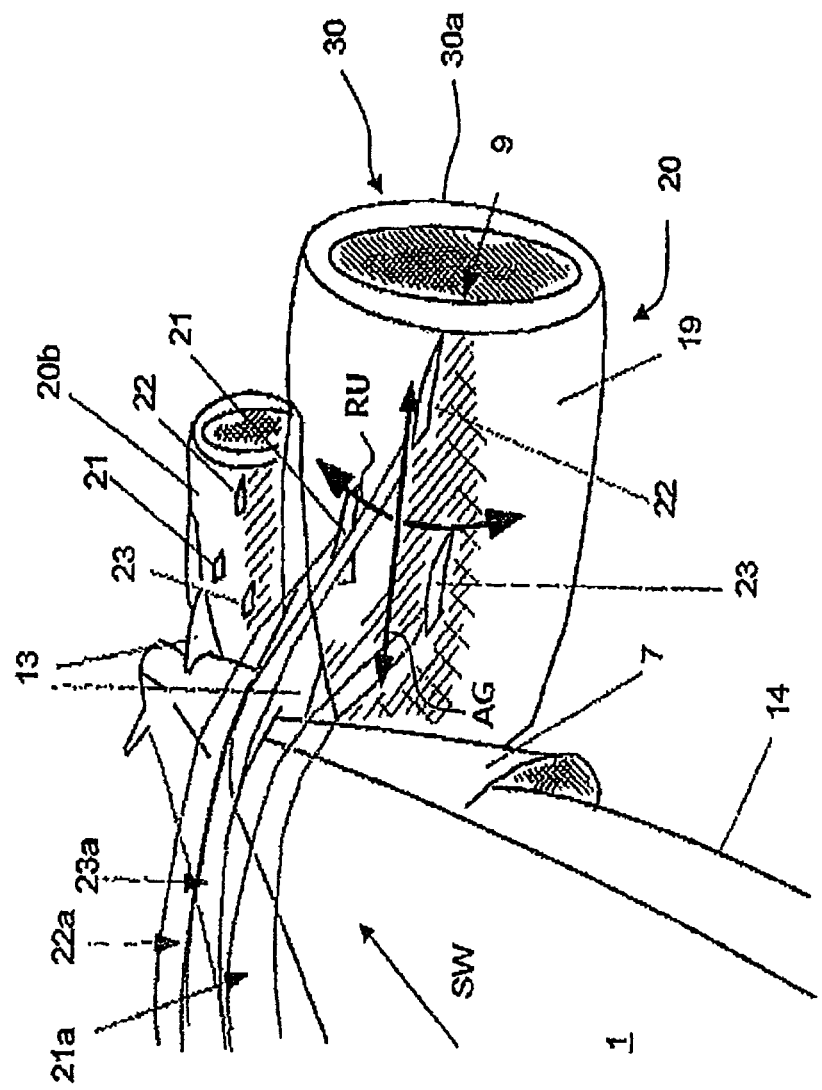
FIG. 3 a perspective view of a wing of an aircraft with engines arranged thereon, as seen from the fuselage of the aircraft in the direction of the wingtip end, wherein on the engine nacelles in each case vortex generator arrangements according to an exemplary embodiment of the invention are provided.

As shown in the perspective sectional top view in FIG. 2, viewed from the wing tip in the direction of the fuselage, the vortex generators 3, 6 are provided, in the case of large angles of attack of the aircraft, i.e. essentially in the takeoff phase and in the landing phase, to generate a field of vorticity that flows over the wing 1 and also over the slat 7 provided on the leading edge of the wing. This field of vorticity comprises two vortices 11, 12 that induce a downwash region 10, in which region increased mixing, caused by vortex activity, of the wing boundary layer with the flow from the surroundings takes place.

The vortex paths 11, 12 and the induced downwash region 10 shown in FIG. 2 are a simplified model-like presentation, with the actual flow conditions likely to be still more complex. However, the diagram shows that the downwash region 10 induced by the vortices 11, 12 is effective to a limited extent in a very narrow region, in relation to the direction of the wingspan, in close proximity to the pylon 13. The vortex generators according to prior art are arranged and designed such that with them influencing of airflow disturbance or of airflow separation takes place, which airflow disturbance or airflow separation are caused by the leading edge of the engine nacelle or by the intersection of the pylon and the wing. Accordingly, according to prior art the vortices generated by the vortex generators are to be effective in a locally limited region and in a region that is as narrow as possible and extending across the direction of flow.

Figure 4:
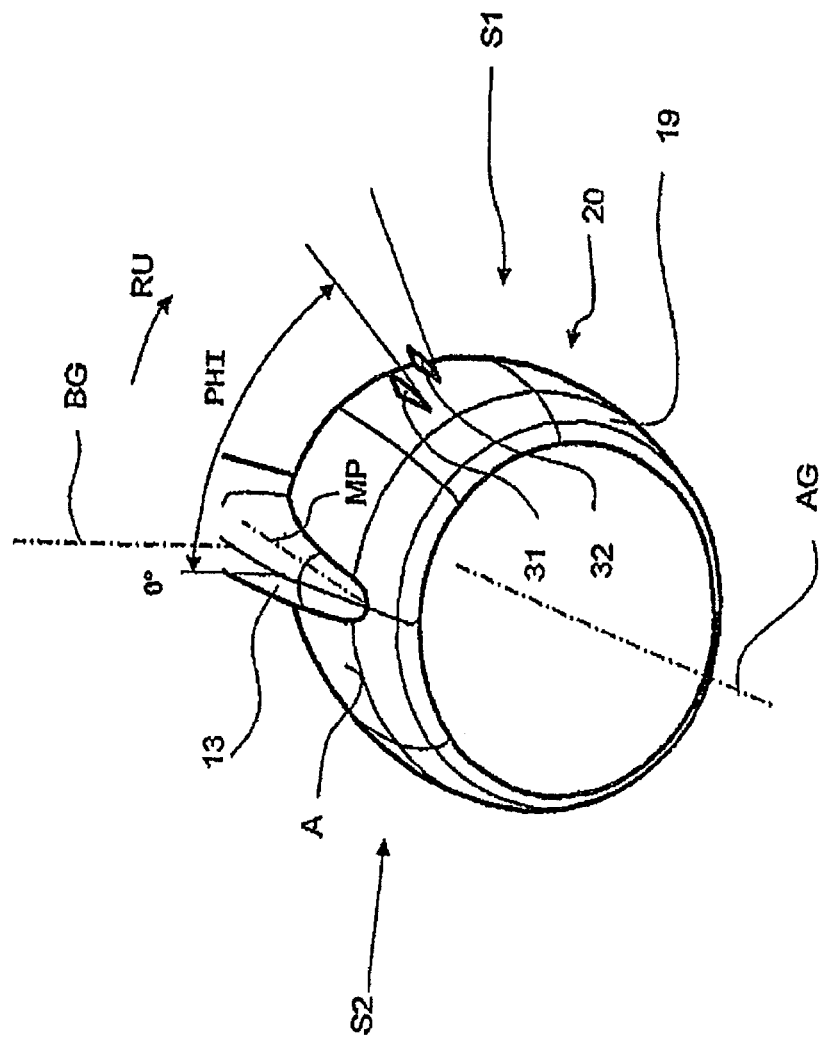
FIG. 4 a perspective view of an engine nacelle with a further exemplary embodiment of an arrangement, according to the invention, of two vortex generators on one side of said engine nacelle, wherein in this view only the vortex generators on a first side of the nacelle housing are shown.

According to the invention (as shown in FIG. 4), on at least one side S1, S2 of a nacelle housing 19 an arrangement comprising several vortex generators is provided, which arrangement is provided such that with it the flow on the outer flow surface, across the direction of flow, becomes turbulent in a sheet-like manner in a region that is as extensive as possible. As a result of the arrangement, according to the invention, of several vortex generators on at least one side of the engine nacelle 20 a correspondingly wide region above the wing becomes turbulent. As a result of the vortex generators, which are all arranged on an engine nacelle, in particular the boundary layer at the top of the wing becomes turbulent in a region which when viewed across the direction of flow is wider than the engine nacelle. With this measure, with the same wing, a greater angle of attack and consequently greater maximum lift of the entire wing is achieved.

According to various exemplary embodiments
  on one side of the engine nacelle 20, several vortex generators, and on the other side no vortex generators or at the most one vortex generator can be arranged;
or as an alternative to the above:
  on both sides of the engine nacelle 20, in each case several vortex generators can be arranged.

In the case of vortex generator arrangements in which only on one side of the engine nacelle 20 several vortex generators are provided, these several vortex generators can be provided
  on the inside of the engine nacelle 2; or
  on the outside of the engine nacelle 2.

FIG. 3 shows an exemplary embodiment of the vortex generator arrangement provided according to the invention, wherein a wing 1 of a four-engined transport aircraft is shown, to which two engine nacelles 20, each accommodating an engine, are connected. The wing 1, which in FIG. 3 is shown from the fuselage to the wing tip, is arranged on the left side of the aircraft with reference to the flight direction of the aircraft. Each engine nacelle 2 is connected to the wing 1 by way of a pylon 13. As shown in the diagram, in the exemplary embodiment shown, the engine nacelles 2 of the inner and of the outer engine are arranged underneath the wing 1 such that the front 30, which faces against the direction of flow, when viewed in the direction of flow is situated significantly in front of the leading edge 14 of the wing 1. In the exemplary embodiment shown, on the inside, i.e. the side facing the fuselage, of the engine nacelles 20, three vortex generators 21, 22, 23 are arranged, which are spaced apart from each other in longitudinal direction RL and in circumferential direction RU of the engine nacelle 20.

In this context the circumferential direction RU of the engine nacelle is defined by the angle phi that extends on a longitudinal axis AG of the housing 19 of the engine nacelle 20. In this arrangement the longitudinal axis AG can, in particular, be defined as the connection line of all area centroids of the area of the nacelle housing 19. Furthermore, the longitudinal axis AG can be identical to the rotational axis of the engine. The angle phi has a value of zero at the position of a vertical axis BG of the housing 19. The vertical axis BG can, in particular, be identical to the vertical axis of the aircraft or of the direction of the wing thickness. Furthermore, the vertical axis BG of the housing 19 can be defined, in particular, such that said vertical axis BG intersects the longitudinal axis AG and a middle axis MP of the pylon. In this arrangement it can further be provided for the vertical axis AG to be situated in the respectively viewed cross section of the housing 19, which cross section intersects the longitudinal axis AG at the corresponding location.

In the exemplary embodiment shown in FIG. 3, on the first side or the side S1 of the housing 19, which side faces the fuselage, of the engine nacelle 20 near the engine pylon 13 and thus near the middle of the engine nacelle 20, a first vortex generator 21 is provided which generates a first vortex or a first vortex path 21a that extends over the wing 1 and if applicable its slat 7. In circumferential direction RU of the engine nacelle 2 from the first vortex generator 3 downward, or in circumferential direction RU spaced apart, i.e. at a larger angle position phi, a second vortex generator 22 is provided which generates a similar vortex path 22a, which, however, in relation to the direction of the wingspan SW of the wing 1 is offset so as to be located clearly further inward, i.e. closer to the longitudinal axis of the aircraft. In the exemplary embodiment shown, the two vortex generators 21, 22 are clearly spaced apart from the front end 9 of the engine nacelle 2 so as to be offset towards the rear, i.e. in the direction of flow, as is shown in FIG. 3.

Furthermore, in the exemplary embodiment shown in FIG. 3, a third vortex generator 23 is provided, which in relation to the circumferential direction UR of the engine nacelle 20 is located between the first vortex generator 21 and the second vortex generator 22, and is furthermore arranged so as to be offset from these, i.e. closer to the front end 9 of the engine nacelle 20. This third vortex generator 23 generates a further vortex path 23a which in turn in relation to the direction of the wingspan SW of the wing 1 extends between the vortex path 21a of the first vortex generator 21 and the vortex path 22a of the second vortex generator 22.

Furthermore, in an exemplary embodiment according to the invention, several, in other words at least two, vortex generators are arranged on the second side, i.e. on the outside S2 of the housing, which side faces away from the fuselage. By arranging the vortex generators and, for example, the three vortex generators 21, 22, 23 provided on the first side 51 of the housing 19 of the inner engine nacelle 20 together with the vortex generators arranged on the second side of the same housing 19, a flow field comprising a multitude of vortex paths, among others comprising the three vortex paths 21a, 22a, 23a shown in FIG. 3, are generated, which flow field in the direction of the span of the wing 1 extends over a region that is significantly larger than the region over which the vortex path 11 of the inner vortex generator 3 in the conventional arrangement shown in FIG. 2 extends.

On the engine nacelle 2 of the outer engine 17, in the exemplary embodiment shown in FIG. 3 a similar vortex generator arrangement that also comprises three vortex generators 21, 22, 23 is provided. The latter generate similar flow fields as do the vortex generators on the engine nacelle 20 situated further towards the fuselage or on the inside, which engine nacelle 20, for the sake of improved clarity, is, however, not shown specifically.

On the outer side, i.e. the side facing away from the fuselage, which side is not visible in FIG. 3, of the inner and/or outer engine nacelles/nacelle 2, in each case several vortex generators are provided. They in turn generate vortex paths similar to the vortex paths 21, 22, 23 shown in FIG. 3. In the arrangement of vortex generators on the respective second side S2 of the nacelle housing 19, said vortex generators can be arranged in a manner that differs from that of the vortex generators arranged on the first side 51 of the same nacelle housing 19. In this arrangement it is possible, in particular, to take into account the geometric condition on the second side S2 of the nacelle housing 19, which geometric condition, due to the wing sweep, differs from the geometric condition on the first side S1. However, the vortex generators on one side S1 of the nacelle housing 19 can also be arranged so as to be symmetrical to vortex generators (in cases where the number of vortex generators on the sides S1, S2 differs) or to the vortex generators on the second side S2 of the same nacelle housing 19 and vice versa.

Looking at the two sides S1, S2 of a nacelle housing 19, it is thus possible on these sides S1, S2 to provide the same number of vortex generators or a different number of vortex generators. Furthermore, depending on a particular application, on these sides S1, S2 the arrangement of two or more than two vortex generators can be identical or it can be different.

The invention is applicable to aircraft comprising one or several engines or nacelle housings on each side of the aircraft or on each wing 1. In the case of an aircraft that on each side comprises two engines or nacelle housings 19, as is the case in the exemplary embodiment shown in FIG. 3, each nacelle housing 19, i.e both the inner nacelle housing and the outer nacelle housing, in each case on its first side S1 in comparison to its second side S2 vortex generator arrangements can be provided that as far as their arrangement and/or number are/is concerned are identical or similar. In the exemplary embodiment shown in FIG. 3, on the first sides S1 of the inner and of the outer nacelle housing 19 the same number and the same arrangement of vortex generators 21, 22, 23 is provided. Depending on a particular application case, the arrangement on the engine nacelle 2 of the outer engine 17 can, however, differ from the arrangement on the inner engine 16.

Of course, positions of vortex generators 21, 22, 23 other than the three positions shown in FIG. 3, which are merely shown for the purpose of providing an example, can however also be provided. It is also possible to provide a number of vortex generators that exceeds three, in an arrangement on one side or on both sides of the nacelle housing 19. A suitable selection can be determined on the basis of the geometric conditions and the aerodynamic design given in the particular aircraft.

Figure 5:
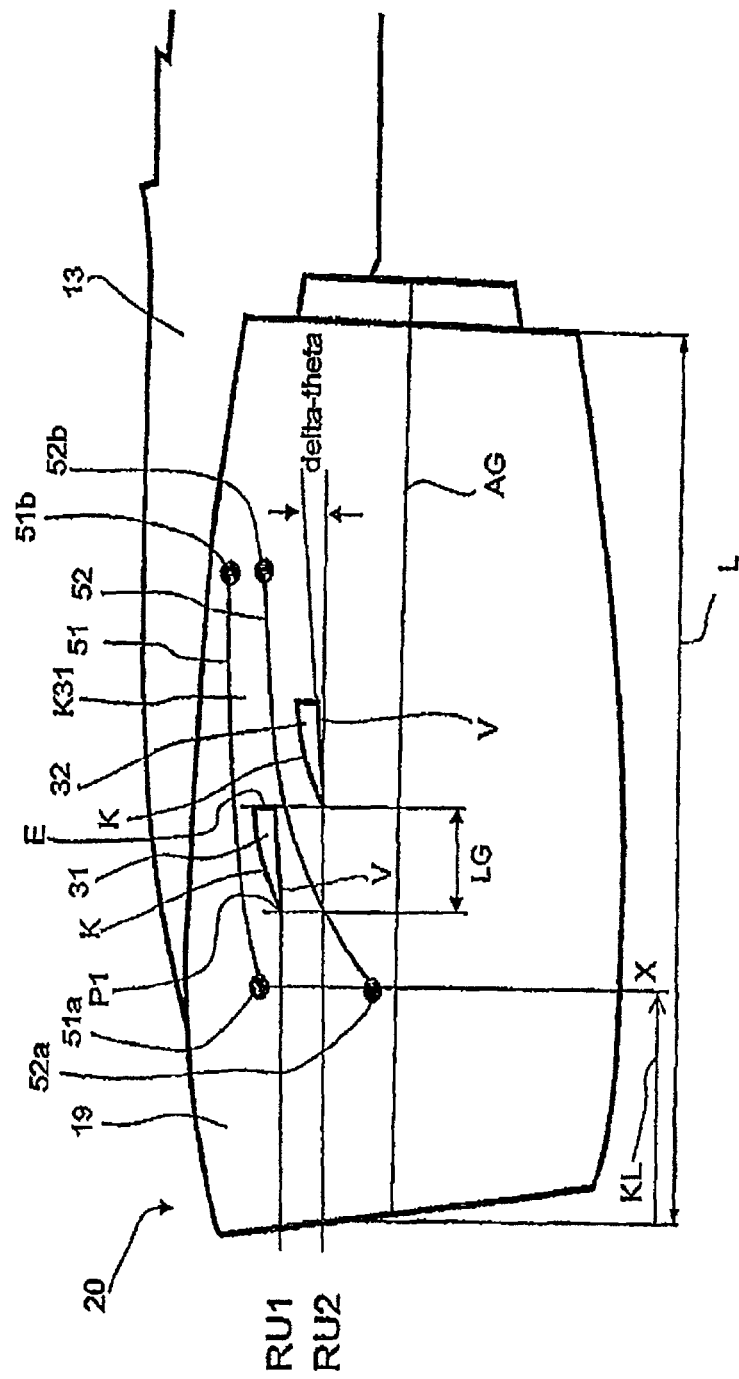
FIG. 5 a lateral view of the engine nacelle according to FIG. 4 with an arrangement, according to the invention, of two vortex generators.

In the exemplary embodiments, shown in FIGS. 4 and 5, of engine nacelles, in each case two vortex generators are arranged on the first side S1. Embodiments according to the invention, for arranging vortex generators, are described with reference to these diagrams.

In one exemplary embodiment the frontmost geometric point of a vortex generator can be placed within a positioning corridor K31 situated between two boundary lines, wherein the starting point 51a of the first boundary line 51 is the circumferential point of the engine nacelle with the engine-nacelle circumferential angle phi=35 degrees and the engine-nacelle longitudinal coordinate X=L/4;

the end point 51b of the first boundary line 51 is the circumferential point of the engine nacelle with the engine-nacelle circumferential angle phi=25 degrees and the engine-nacelle longitudinal coordinate X=L·⅔;

the starting point 52a of the second boundary line 52 is the circumferential point of the engine nacelle with the engine-nacelle circumferential angle phi=90 degrees and the engine-nacelle longitudinal coordinate X=L/4;

the end point 52b of the second boundary line 52 is the circumferential point of the engine nacelle with the engine-nacelle circumferential angle phi=55 degrees and the engine-nacelle longitudinal coordinate X=L·⅔.

In this arrangement the boundary line is the line that extends along the external circumference of the engine nacelle, which line is the shortest line between the starting point of said external circumference and the end point of said external circumference. In this context the term engine-nacelle longitudinal coordinate KL refers, in particular, to a coordinate that extends along the longitudinal axis AG of the nacelle housing, wherein the longitudinal coordinate KL of a point on the external surface of the nacelle housing results from the vertical plane that extends through this point and that is defined by the longitudinal axis AG. The starting point of the longitudinal coordinate KL can, in particular, be the point where the longitudinal axis AG intersects the area in which the rim line of the front end 30a of the nacelle housing is situated. The point where the entry plane of the nacelle housing 19 intersects the longitudinal axis AG is the starting point of the longitudinal coordinate KL.

This corridor K31 is provided for the frontmost geometric point P1 (circumferential direction position RU1) of the first vortex generator 31, which in relation to the circumferential direction RU is the uppermost vortex generator, which vortex generator 31 also takes up the position with the smallest angle phi. The second vortex generator 32 is situated on the engine circumferential angle of phi=10 to 30 degrees in circumferential direction RU below the first vortex generator.

In an arrangement of two vortex generators on a side S1, S2 of a nacelle housing, in one exemplary embodiment the entire extension of the combination or arrangement of vortex generators in circumferential direction RU does not exceed delta-PHI=30°. Furthermore, in another exemplary embodiment two vortex generators that are adjacent to each other in circumferential direction UR are spaced apart from each other no further than delta-PHI=30°. In this case the longitudinal extension of the combination can also be delimited by an overlap of the vortex generators in the longitudinal coordinate KL.

In relation to the longitudinal coordinate KL, in each case two vortex generators can be arranged so as to be overlapping in their longitudinal direction. This can, in particular, apply to the two vortex generators that are adjacent in circumferential direction RU. The overlap is, in particular, up to 50% of the longitudinal extension of the respective front vortex generator. Moreover, in each case two vortex generators, in particular the two vortex generators that are adjacent in circumferential direction RU, can be spaced apart in relation to the longitudinal coordinate KL. In a preferred exemplary embodiment this spacing does not exceed 50% of the longitudinal extension of the respective front vortex generator.

These measures also apply to the arrangement of more than two vortex generators on a side S1, S2 of the nacelle housing in each case for two vortex generators. In this arrangement the vortex generators which in each case are adjacent in the longitudinal coordinate KL or in the circumferential direction RU need not be taken into account.

In the exemplary embodiment shown in FIG. 5 a second vortex generator 32 is installed below the first vortex generator 31, wherein the X-coordinate of its projection point P2 (circumferential direction position RU2) in longitudinal direction of the nacelle housing 19 coincides with the end E of the first vortex generator (±10% of the length of the vortex generator) and is thus located approximately at ½ the nacelle length. In this embodiment the radial angle of the second generator is PHI=75°.

Depending on the special aircraft geometry, the front point P of the first vortex generator 31 can also be positioned further downstream in the corridor K31. Consequently the first vortex generator is situated in a region of the nacelle 20, which region in the case of large angles of attack of the aircraft experiences a strong upward flow and is thus subjected to a strong local angle of attack. This applies in the case of a clearly lateral position (PHI>=45°, wherein rearward positions exceeding ⅔ of the length L of the engine nacelle 20 are less likely to be worth considering.

The frontmost vortex generator should not be placed at a position that is situated less than ¼ of the length L of the engine nacelle from the starting point of the longitudinal coordinate KL.

The vortex generators are designed in a fin shape and comprise a connecting region V by means of which they make a structural transition to the outer flow surface A of the nacelle housing 19. Furthermore, the vortex generators comprise a length LG, which extends in the longitudinal direction of the vortex generator, which length is given in particular by the length of the connecting region and its line of intersection with a middle plane of the vortex generator. The longitudinal direction of the vortex generator extends from the side which faces towards the flow to the side which faces away from said side. A middle plane of the vortex generator results from the centroid lines of the area of the cross sections of the vortex generator across the direction of flow. Furthermore, each vortex generator comprises an external contour K that protrudes from the outer flow surface A of the nacelle housing 19.

Figure 6:
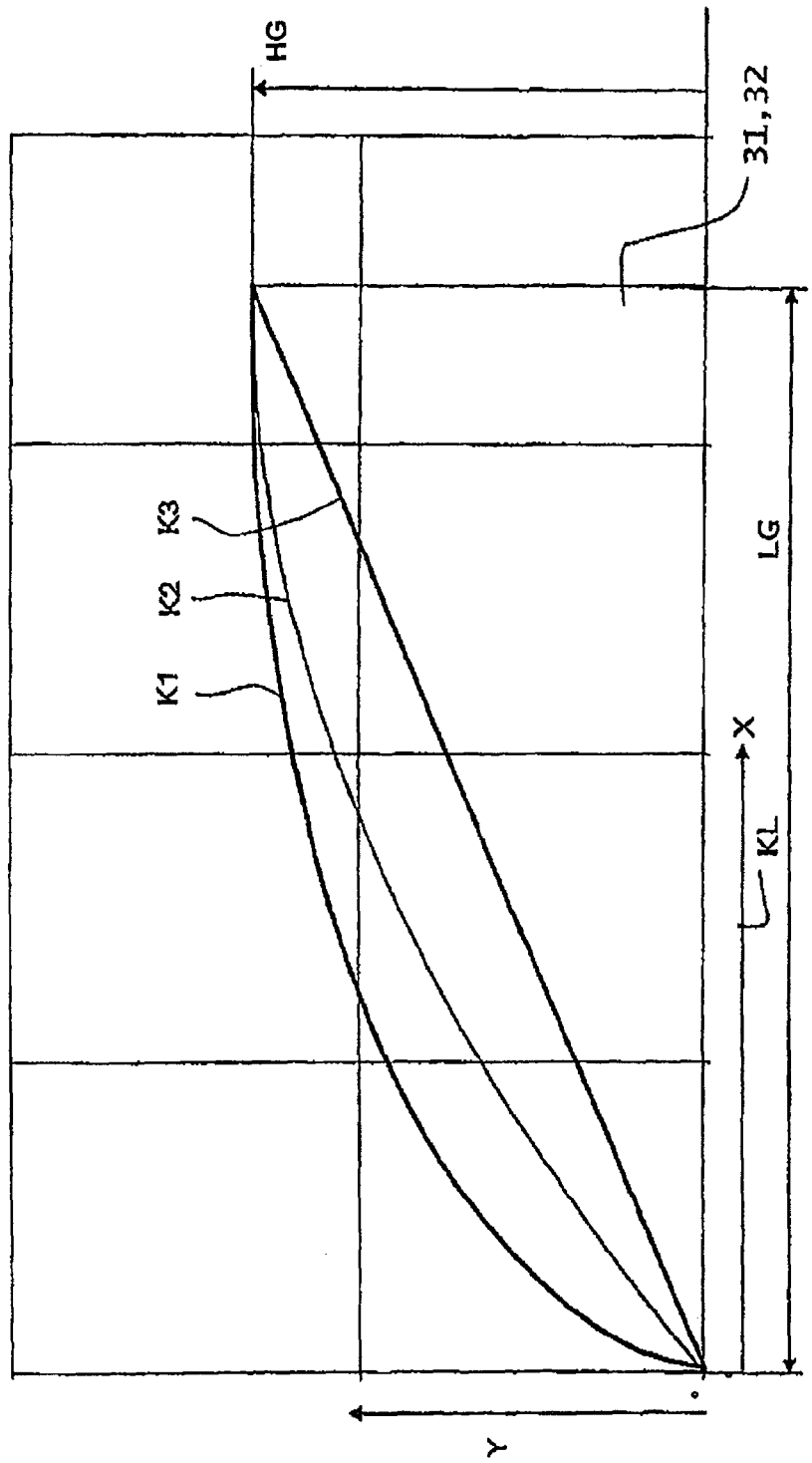
FIG. 6 a diagram to describe geometric characteristics of the design of an exemplary embodiment of a vortex generator provided according to the invention.

According to the invention, the external contour K of an exemplary embodiment of the vortex generator extends, gradually rising over the connection region V, from the outer flow surface A of the nacelle housing to a maximum height HG at the rear end of the respective vortex generator (line K2 in FIG. 6).

The external contour K of a vortex generator can also be designed as a straight line (line K3 in FIG. 6).

As an alternative the external contour K of a vortex generator can also be designed as a quarter ellipse (line K1 in FIG. 6).

Furthermore, the external contour K of the vortex generator, which contour protrudes from the outer flow surface A, can be defined in relation to the shape of the connecting region (V) in longitudinal direction X of the vortex generator by the function $$Y = HG \cdot [1 - (LG - X)^2 / LG^2]$$

with
X denoting the longitudinal coordinate of the vortex generator with an overall length LG of the vortex generator;
Y denoting the height coordinate of the vortex generator with a maximum height HG of the vortex generator opposite the outer flow surface A on the longitudinal coordinate X=LG,
wherein the external contour K1 that protrudes from the outer flow surface A is situated in a region of ±10% of the Y-value resulting from the function.

Each of the vortex generators on a nacelle housing 19 can, in particular, be designed according to one of these embodiments. In particular, the vortex generators on one side S1, S2 of a nacelle housing can be identical in design.

The ratio of length of the vortex generator/length of the nacelle is typically approximately 10% to 15%; however, it also individually depends on the particular case of application.

An engine nacelle is installed underneath the wing and in front of the wing. In a top view, the point where the engine axis penetrates the exit plane of the fan airstream is located approximately at the leading edge of the wing (not directly shown in the figures).

The longitudinal direction of the vortex generators relative to the longitudinal axis of the engine nacelle can, in particular, be inclined by delta-theta=0 to 10 degrees. In this arrangement the inclination of the vortex generator is provided such that the rear end of the vortex generator relative to the engine axis is situated above its projection point. The longitudinal inclination of the vortex generator is selected such that the drag is as low as possible during cruising.

The vortices generated on the vortex generators are fed over the wing by the airstream flowing around the engine-wing combination. In this arrangement the absolute position of the first vortex generator and the relative positions of further vortex generators from the first vortex generator are decisive in determining the desired propagation, in the direction of the wingspan, of the "wake" and thus in determining the effect on maximum lift.

Adjusting the positions of the vortex generators in a wind tunnel can, in particular, be carried out interactively by measuring the vortex positions above the wing (wake measuring). Furthermore, airflow calculations can be used for optimisation, namely by determining the global flow field and thus determining the potential vortex positions even prior to wind tunnel experiments.

The vortex generators provided according to the invention are designed in the shape of fins. In relation to the longitudinal axis of the nacelle housing AG, these fins can extend parallel to said longitudinal axis AG or at an angle to this longitudinal axis AG of the engine nacelle 2. The design and position of the individual vortex generators are provided such that with a progressive increase of the angle of attack of the aircraft a progressively more intensive field of vorticity is generated. The vortex generators are, in particular, designed as fins, wherein their longitudinal plane or middle plane or symmetry plane can be arranged radially or at an angle to the radial direction of the nacelle housing relative to the longitudinal axis AG of said nacelle housing.

The vortex generators of the arrangement according to the invention can be designed right from the start in the development of an aircraft, or an existing aircraft can advantageously be retrofitted with said vortex generators. In particular, the vortex generators can be designed in one piece or as an integral part of the nacelle housing 19, or as a part that is installable on the nacelle housing.

The invention claimed is:
1. An engine nacelle of an aircraft, comprising:
a nacelle housing having an outer flow surface, a front end, a first side and a second side, and a longitudinal axis that is coaxial with a rotational axis of an engine to be mounted within the nacelle housing; and
a plurality of vortex generators, wherein each vortex generator is formed as a fin-shaped vortex generator having a connection region laying completely on the outer flow surface of the nacelle housing, and wherein the plurality of vortex generators are arranged at least on one of the first and second sides of the nacelle housing to generate turbulent airflow,
wherein a first of the plurality of vortex generators is positioned closest to the front end of the nacelle housing and at an engine-nacelle longitudinal coordinate of X≥L/4, where L is a length of the nacelle housing, X is a position along a longitudinal coordinate extending parallel to the longitudinal axis, and a starting point of the engine-nacelle longitudinal coordinate is a point at which an entry plane of the nacelle housing intersects the longitudinal axis, and the plurality of vortex generators are arranged in such a way that the overall vorticity field generated by the plurality of vortex generators extends over an increasing wing area in the wingspan direction of a wing of the aircraft as the angle of attack increases in order to improve maximum lift.

2. The engine nacelle according to claim 1, wherein:
the nacelle housing includes: (i) a vertical axis that is perpendicular to the longitudinal axis and running through a middle axis of a pylon running parallel to the longitudinal axis, and (ii) an engine-nacelle circumferential angle, phi, which is measured from the vertical axis and circumferentially along the outer flow surface;
the first vortex generator is located at a smallest engine-nacelle circumferential angle, phi, as compared with the other vortex generators;
a frontmost point of the first vortex generator is located within a positioning corridor situated between first and second boundary lines;
a starting point of the first boundary line is a circumferential point of the engine nacelle with the engine-nacelle circumferential angle phi=35 degrees and the engine-nacelle
longitudinal coordinate X=L/4;
an end point of the first boundary line is the circumferential point of the engine nacelle with the engine-nacelle circumferential angle phi =25 degrees and the engine-nacelle longitudinal coordinate X=L·⅔;
a starting point of the second boundary line is the circumferential point of the engine nacelle with the engine-nacelle circumferential angle phi=90 degrees and the engine-nacelle longitudinal coordinate X=L/4;
an end point of the second boundary line is the circumferential point of the engine nacelle with the engine-nacelle circumferential angle phi=55 degrees and the engine-nacelle longitudinal coordinate X=L·⅔; and
in each case the boundary line is the line that extends over the external circumference of the engine nacelle and is a shortest line between the starting point of said external circumference and the end point of said external circumference.

3. The engine nacelle according to claim 1, wherein the vortex generators are arranged on a side of the nacelle housing, which side faces towards a fuselage.

4. The engine nacelle according to claim 1, wherein at least one of the vortex generators is arranged on the second side, an outboard side, of the nacelle housing.

5. The engine nacelle according to claim 4, wherein:
on each of the first and second sides of the nacelle housing, a respective plurality of the vortex generators are arranged;
the nacelle housing includes: (i) a vertical axis that is perpendicular to the longitudinal axis and running through a middle axis of a pylon running parallel to the longitudinal axis, and (ii) an engine-nacelle circumferential angle, phi, which is measured from the vertical axis and circumferentially along the outer flow surface;
in each of the respective plurality of vortex generators, a frontmost point of a first of the plurality of vortex generators is located within a positioning corridor situated between first and second boundary lines;
a starting point of the first boundary line is a circumferential point of the engine nacelle with the engine-nacelle circumferential angle phi=35 degrees and the engine-nacelle longitudinal coordinate X=L/4;
the end point of the first boundary line is the circumferential point of the engine nacelle with the engine-nacelle circumferential angle phi=25 degrees and the engine-nacelle longitudinal coordinate X=L·⅔;
the starting point of the second boundary line is the circumferential point of the engine nacelle with the engine-nacelle circumferential angle phi=90 degrees and the engine-nacelle longitudinal coordinate X=L/4;
the end point of the second boundary line is the circumferential point of the engine nacelle with the engine-nacelle circumferential angle phi=55 degrees and the engine-nacelle longitudinal coordinate X=L·⅔; and
in each case the boundary line is the line that extends over the external circumference of the engine nacelle and is the shortest line between the starting point of said external circumference and the end point of said external circumference.

6. The engine nacelle according to claim 2, wherein a second vortex generator is situated on the engine-nacelle circumferential angle of phi=10 to 30 degrees below the first vortex generator.

7. The engine nacelle according to claim 1, wherein respective longitudinal directions of the vortex generators are inclined by delta-theta=0 to 10 degrees in relation to the longitudinal axis of the engine nacelle.

8. The engine nacelle according to claim 1, wherein each vortex generator includes an external contour that protrudes from the outer flow surface and extends, gradually rising, from the connection region at the outer flow surface of the nacelle housing to a maximum height at a rear end of the respective vortex generator.

9. The engine nacelle according to claim 8, wherein the external contour of at least one vortex generator is a straight line.

10. The engine nacelle according to claim 8, wherein a ratio of the overall length to the maximum height of the vortex generator is between 1.4 and 3.6.

11. The engine nacelle according to claim 8, wherein the overall length of the vortex generator relative to a length of the engine nacelle is between 0.10 and 0.15.

12. The engine nacelle of an aircraft, according to claim 8, wherein a distance of the external contour of at least one vortex generator from the outer flow surface, defined by a gradient of the connection region in the longitudinal direction of the vortex generator is defined by the function $Y=HG \cdot [1-(LG-X)^2/LG^2]$, with:
X being a longitudinal coordinate of the vortex generator with an overall length LG of the vortex generator;
Y being a height coordinate of the vortex generator with a maximum height HG of the vortex generator in relation to the outer flow surface on the longitudinal coordinate X=LG; and
wherein the external contour protruding from the outer flow surface is within the range of ±10% of the Y-value resulting from the function.

13. The engine nacelle according to claim 1, wherein the plurality of vortex generators are arranged to overlap in the longitudinal direction.

* * * * *